US007219938B2

(12) United States Patent
Brister et al.

(10) Patent No.: US 7,219,938 B2
(45) Date of Patent: May 22, 2007

(54) BACKING RING FOR RAILCAR AXLE

(75) Inventors: Stephen E. Brister, North Canton, OH (US); David G. Toth, North Canton, OH (US); Rudolph C. Karich, Farragut, TN (US); Ryan J. Anderson, North Canton, OH (US); Gerald P. Fox, Massillon, OH (US); Samuel R. Williams, Dublin, OH (US)

(73) Assignee: The Timken Company, Canton, OH (US)

( * ) Notice: Subject to any disclaimer, the term of this patent is extended or adjusted under 35 U.S.C. 154(b) by 9 days.

(21) Appl. No.: 10/871,147

(22) Filed: Jun. 18, 2004

(65) Prior Publication Data

US 2005/0052043 A1 Mar. 10, 2005

Related U.S. Application Data

(60) Provisional application No. 60/555,482, filed on Mar. 23, 2004, provisional application No. 60/501,353, filed on Sep. 9, 2003.

(51) Int. Cl.
*F16C 19/50* (2006.01)

(52) U.S. Cl. .......................... 295/42; 384/459; 384/584

(58) Field of Classification Search ................ 384/571, 384/489, 582, 486, 459, 476, 584; 105/224.1; 301/105.1; 295/36.1, 37, 41, 42, 42.1
See application file for complete search history.

(56) References Cited

U.S. PATENT DOCUMENTS

| | | | | |
|---|---|---|---|---|
| 1,401,141 A | * | 12/1921 | Danilesson | ................. 384/459 |
| 1,451,690 A | * | 4/1923 | Fleming | ....................... 295/42 |
| 1,533,761 A | * | 4/1925 | Sanford | ....................... 295/42 |
| 2,406,069 A | * | 8/1946 | Freeman | ..................... 384/582 |
| 3,802,352 A | * | 4/1974 | Keller | ......................... 105/181 |
| 5,017,025 A | | 5/1991 | Williams | |
| 5,028,152 A | * | 7/1991 | Hill et al. | .................... 384/557 |
| 5,462,367 A | | 10/1995 | Davidson et al. | |
| 5,549,395 A | * | 8/1996 | Sink | ........................... 384/477 |
| 5,722,327 A | * | 3/1998 | Hawthorne et al. | ...... 105/218.1 |
| 6,126,321 A | * | 10/2000 | Fetty et al. | ................. 384/459 |
| 6,312,161 B1 | * | 11/2001 | Williams | ..................... 384/459 |
| 2005/0078897 A1 | * | 4/2005 | Zhang | ......................... 384/476 |

FOREIGN PATENT DOCUMENTS

| | | |
|---|---|---|
| EP | 0450793 A2 | 10/1991 |
| EP | 0450793 A3 | 10/1991 |
| JP | 04-271243 A * | 4/1992 |

* cited by examiner

*Primary Examiner*—Russell D. Stormer
(74) *Attorney, Agent, or Firm*—Polster, Lieder, Woodruff & Lucchesi, L.C.

(57) ABSTRACT

A backing ring that serves to back an antifriction bearing on the journal of a rail car axle includes an annular body that seats against a fillet that is located at the end of the journal and also a lip that projects over a larger dust guard diameter that is located on the axle immediately beyond the fillet. In addition, the backing ring includes a stabilizing element which cooperates with the lip and with the dust guard diameter to lessen the tendency of the annular body to work against the fillet and create a fretting wear when the journal undergoes cyclic flexures. The stabilizing element accommodates dust guard diameters of varying size. The stabilizing element may also establish a seal between the lip and the dust guard diameter.

26 Claims, 6 Drawing Sheets

BACKING RING FOR RAILCAR AXLE

CROSS REFERENCE TO RELATED APPLICATIONS

This application derives priority from U.S. provisional application 60/501,353, of Stephen E. Brister et al., filed Sep. 9, 2003, and entitled "Universal Fit Backing Ring", and from U.S. provisional application 60/555,482 of the same inventors, filed Mar. 23, 2004, and also entitled "Universal Fit Backing Ring", priority being claimed from both provisional applications.

STATEMENT REGARDING FEDERALLY SPONSORED RESEARCH OR DEVELOPMENT

BACKGROUND OF THE INVENTION

This invention relates in general to backing rings for the bearings on railroad axles and, more particularly, to stabilized backing rings that fit axles of varying diameter.

The typical bearing for a railcar fits around a journal at the end of a railcar axle where it is captured between a backing ring and an end cap. The backing ring seats against a fillet that merges into an enlarged dust guard diameter, while the end cap fits over the end of the journal to which it is secured with cap screws. On most journals seal wear rings fit between the bearing and the backing ring and also between the bearing and the end cap. Seals encircle the wear rings and exclude contaminants from the bearing. When tightened, the cap screws bear down against the end cap and clamp the bearing securely between the backing ring and end cap. This forces the backing ring snugly against the fillet.

The journals on any rail car axle represent the regions of least diameter in the axle, yet it is through these journals and nearby dust guard diameters, which are somewhat larger, that the weight of the rail car is transferred to the wheels. Being subject to considerable weight, the journals flex cyclically as wheels roll along the rails of a railroad track, with most of the flexure occurring near the small ends of the fillets. The flexure produces fretting between the backing ring and the fillets, and as a consequence both experience wear. When water seeps into the spaces between the backing rings and the fillets, it exacerbates the fretting with corrosion. Sometimes the wear at a journal is enough to eliminate the clamp fit that holds the bearing in place, and this disturbs the setting for the bearing, imparting more end play than desired. Over the years the Association of American Railroads (AAR) has increased the allowable gross rail load on the 100-ton nominal capacity rail car, which is used bulk commodity transport, from 56427 newtons (25100 lbs) to 59125 newtons (263000 lbs.) in 1961 and then to 64295 newtons (286000 lbs) in 1990. This contributed to axle flexing of a higher magnitude which in turn led to greater fretting wear.

To combat fretting wear and corrosion at axle fillets, bearing manufacturers introduced the fitted backing ring. It had an annular lip which extended axially over the dust guard diameter adjacent to the fillet. Moreover, the AAR set standards for the fitted backing rings and further specified a tolerance for the dust guard diameters so that an interference fits would exist between the dust guard diameters and the annular lips of the backing rings. Thus, a fitted back ring required the application of some force during the last increment of installation, this to overcome the interference fit. The press-fit stiffened the joint between the backing ring and the fillet on the journal and excluded moisture, thus reducing both fretting and corrosion between the backing ring and the journal. However, the MR specified larger dust guard diameters for the new axles—dust guard diameters larger than those on older traditional axles. This enabled the new fitted backing rings to be used interchangeably with the old traditional axles and the new axles, but without interference fits on the older axles. In the absence of an interference fit, a fitted backing ring possesses little, if any, advantage over a more traditional backing ring without a lip.

DETAILED DESCRIPTION OF INVENTION

Figure 1:
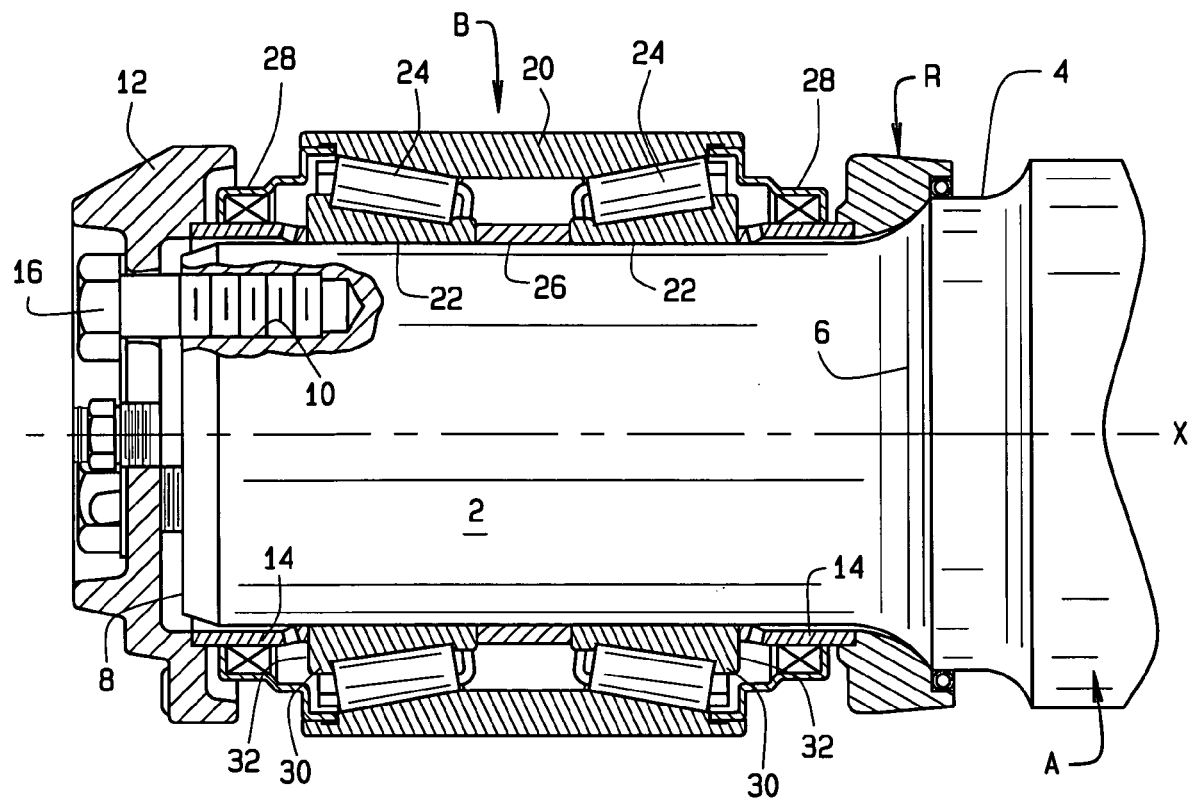
FIG. 1 is a longitudinal sectional view of a journal on a railcar axle and a bearing located around the journal, with the journal behind the bearing being fitted with a backing ring constructed in accordance with and embodying the present invention.

Referring now to the drawings (FIG. 1), a railcar axle A, to which wheels are fitted, rotates about an axis X as the wheels roll along the rails of a railroad track. The axle A, along with several other like axles, supports a rail car, with the weight of the rail car being transferred to the axle through bearings B.

The axle A at each of its ends has a journal 2 which leads to a somewhat larger dust guard diameter 4 at a fillet 6. Inwardly from the dust guard diameter 4 the axle A has an even larger wheel seat to which a wheel is fitted. The journal 2 extends out to an end face 8 out of which threaded holes 10 open. Both the journal 2 and the dust guard diameter 4 are cylindrical and concentric, with their common center being the axis X.

The bearing B fits around the journal 2 where it is captured between a backing ring R that bears against the fillet 6 and an end cap 12 that extends over the end face 8, yet is spaced slightly outwardly from it. The bearing B is separated from the backing ring R and from the end cap 12 by wear rings 14, and all are clamped tightly together with cap screws 16 which thread into the holes 10 and bear against the end cap 16.

The bearing B includes an outer race in the form of a cup 20, an inner race in the form of two cones 22 located within the cup 16, and rolling elements in the form of tapered rollers 24 located between the cup 20 and cones 22. In addition, the bearing B includes a spacer 26 located between the two cones 22 to maintain a prescribed spacing between the cones 22. The ends of the bearing B are closed by seals 28 located between the ends of the cup 20 and the wear rings 14. The cones 22 fit over the journal 2 of the axle A with an interference fit, with the spacer 26 being between them. The cup 20 fits into an adapter which in turn fits into the truck of a railcar. The tapered rollers 24 lie along tapered raceways on the cup 20 and cones 22 where they are organized in two rows—one around the inboard cone 22 and the other around the outboard cone 22. The raceways of the two cones 22 tapered in opposite directions and so do the two raceways of the cup 20. This orients the rollers 24 such that the rollers 24 of the inboard row take thrust or axial loads in one direction, and the rollers 24 of the outboard row take thrust in the opposite direction. The rollers 24 of both rows transfer radial loads. At their ends the cones 22 have thrust ribs 30 which confine the rollers 24 to the annular space between the cup 20 and cones 22. The thrust rib 30 of each cone 22 leads out to back face 32, which is squared off with respect to the axis X. The bearing B transfers thrust loads to the axle A primarily at the back faces 32 of its cones 22.

Actually the thrust loads transferred through the inboard cone 22 pass to the journal 2—or axle A—through the inboard wear ring 14 and the backing ring R which lie between the back face 32 of the inboard cone 22 and the fillet 6 on the journal 2. The thrust loads transferred through the outboard cone 22 pass to the journal 2 through the outboard wear ring 14, the end cap 12 and the cap screws 16. The end cap 32 fits over the end of the journal 2 and against the outboard wear ring 14 which in turn is against the back face 30 of the outboard cone 18. Indeed, the cap screws 16 clamp the two cones 22 and the spacer 26 and the wear rings 14 tightly between the backing ring R and the end cap 12 and urge the backing ring R firmly against the fillet 6.

As the axle A revolves it will experience some flexure, with the greatest flexure occurring at each journal 2 in the region of the back face 32 for the inboard cone 22. To prevent that flexure from imparting undue motion to the backing ring R on the fillet 6 and thereby producing fretting at the fillet 6, the backing ring R is fitted firmly to the journal 2 around the region of the dust guard diameter 4 that lies immediately beyond the fillet 6. Indeed, the backing ring R, irrespective of the form it assumes, includes at least one element which stabilizes the backing ring R on the journal 2 from axial, radial, or circumferential movement relative to the axle A. This reduces the potential for removing the bearing B from service due to a loose backing ring R. The backing ring R also inhibits the seepage of moisture along the fillet 6 and thus reduces fretting corrosion between the two.

Figure 2:
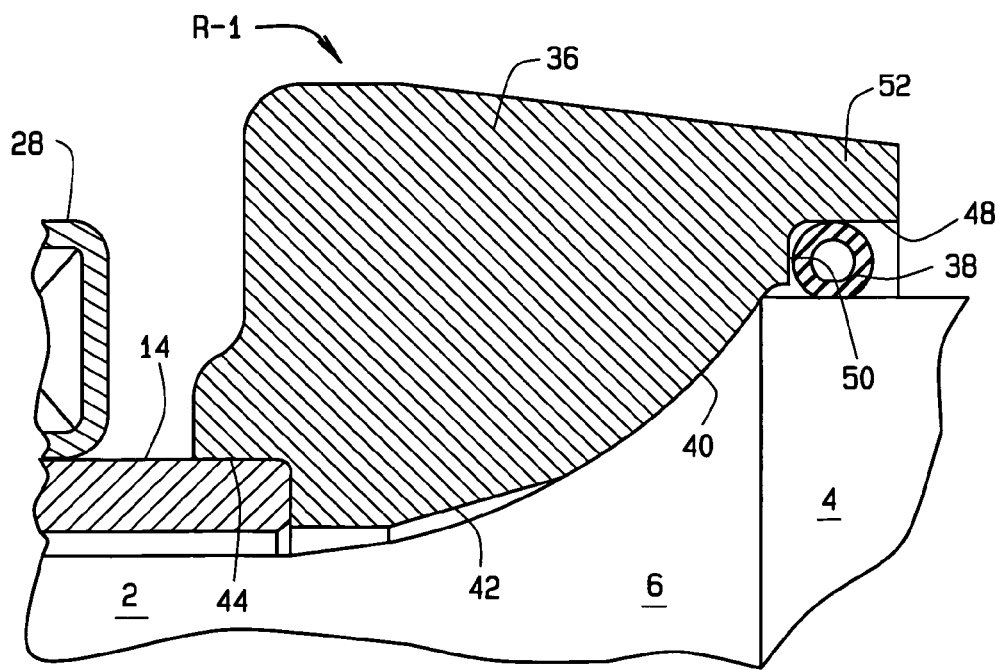
FIG. 2 is an enlarged sectional view of the backing ring on the fillet of the journal.

The backing ring R may be any of several variations. One, a backing ring R-1, includes (FIG. 2) an annular body 36 that fits around the fillet 6 and further projects over the dust guard diameter 4. In addition, the backing ring R-1 has a stabilizing ring 38 which fits between the annular body 36 and the dust guard diameter 4 where the ring 38 remains in a state of radial compression.

The annular body 36 is preferably formed as a steel or iron casting or forging that is machined along critical surfaces. One of those surfaces is an arcuate inner surface 40 that is contoured to seat against the fillet 6 in the upper or larger regions of the fillet 6. The inner surface 40 tapers downwardly to a conical surface 42 which is spaced slightly away from the fillet 6, and the conical surface 46, in turn, leads out to a counterbore 44 which receives the end of the inboard wear ring 14 with an interference fit. The opposite end of the inboard wear ring 14 bears against the back face 32 of the inboard cone 22. The inboard wear ring 14, by reason of the clamping force exerted by the cap screws 16, bears firmly against the annular body 34 at the end of the counterbore 44. At its opposite end the annular body 34 has a lip 46 which projects axially beyond the arcuate inner surface 40 and over the adjacent region of the dust guard diameter 4 on the axle A, yet is spaced from the dust guard diameter 4. The lip 46 contains a counterbore 48 that at one end leads away from a shoulder 50 and at its opposite end opens out of the lip 46.

Figure 3:
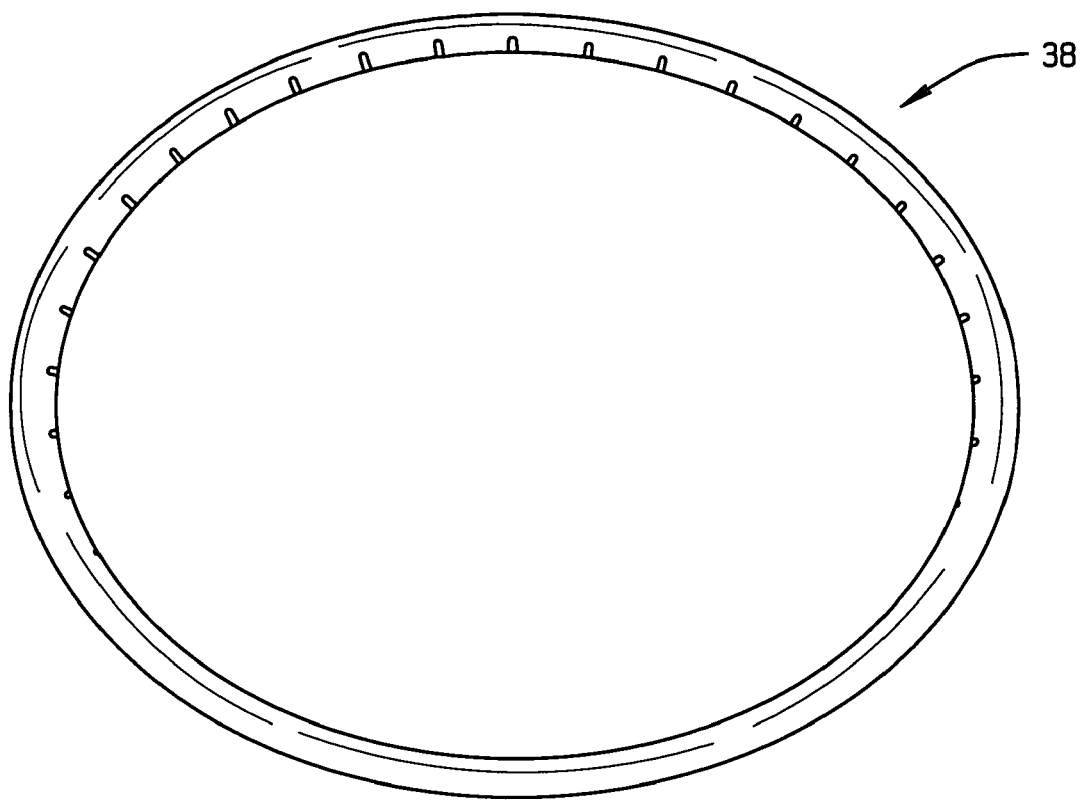
FIG. 3 is a perspective view of the stabilizing ring for the backing ring.

The stabilizing ring 38 fits within the counterbore 48 in the lip 46 of the annular body 36 (FIGS. 2 & 3) and around the dust guard diameter 4 and stabilizes the annular body 36 on the axle A against axial, radial and circumferential movement relative to the axle A. The ring 38, which is preferably formed from a stainless steel or other suitable material, including some polymers, possesses a generally circular and tubular cross section and has axially directed apertures arranged at equal circumferential intervals along its inside surface to better accommodate deformation of the tubing, from which the ring 38 is formed, from straight to circular. The apertures are filled with a flexible substance such as a silicone sealer. Other materials such as polymers are suitable. The inside diameter of the stabilizer ring 38 is less than the diameter of the dust guard diameter 4, while the outside diameter is slightly greater than the diameter of the counterbore 48 in the lip 46. As a consequence, interference fits exist between the stabilizing ring 38 and both the dust guard diameter 4 and the surface of the counterbore 48. Indeed, the stabilizing ring 38, being tubular in cross section, compresses between the two surfaces to accommodate the interference fit.

To install backing ring R-1 on the journal 2 of the axle A, the stabilizing ring 38 is forced into the counterbore 48 in the lip 46 of the annular body 36 with enough force to overcome the interference fit and to drive the ring 38 against the shoulder 50 at the end of the counterbore 48. Then the backing ring R-1 is advanced over the journal 2 to bring its stabilizing ring 38 to the peripheral margin of the fillet 6. At this juncture enough force is applied to the annular body 36 on the backing ring R-1 to overcome the interference fit between the stabilizing ring 38 and the dust guard diameter 4. The stabilizing ring 38 rides up onto the dust guard diameter 4 and advances until the arcuate surface 40 on the annular body 34 seats against the fillet 6. Thereafter, the wear rings 14 and bearing B are installed over the journal 2. Afterwards, the end cap 12 is placed over the end face 8 and secured to the journal 2 with the cap screws 16.

Since the stabilizing ring 38 fits rigidly compressed between the lip 46 of the annular body 36 and the dust guard diameter 4, it inhibits the lip 46 from moving radially with respect to the dust guard diameter 4. This adds a greater measure of stability to the annular body 36, and as a consequence, less movement occurs between the arcuate surface 44 on the annular body 40 and the fillet 6 against which it seats. The arcuate surface 40 and the fillet 6 experience little, if any fretting. The stabilizing ring 38 further excludes contaminants, such as water, from the fillet 6 of the axle A and the arcuate surface 40 of the annular body 36.

Figure 4:
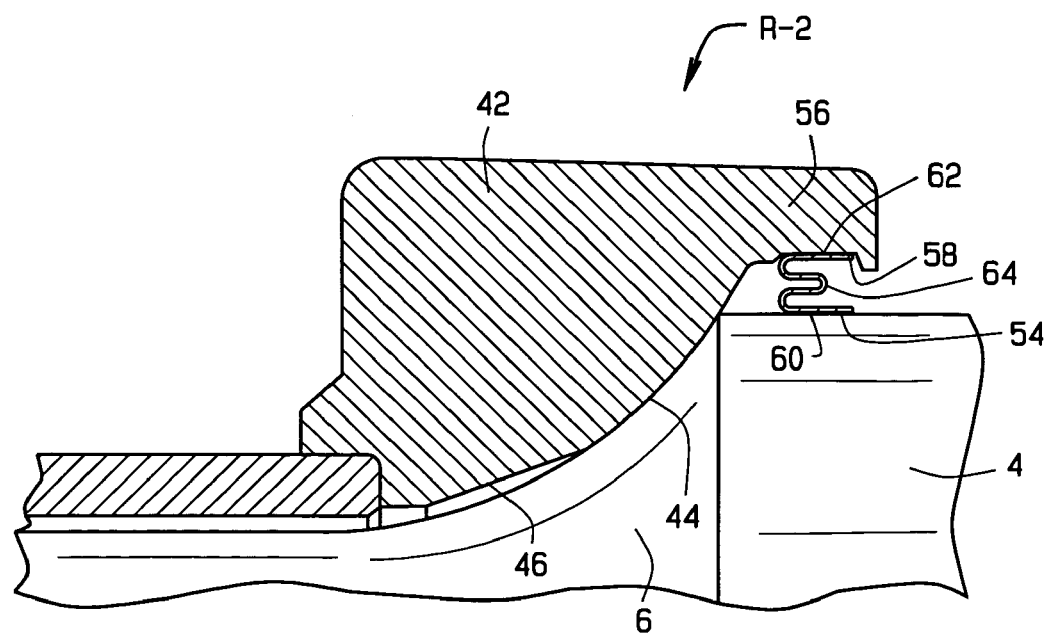
FIG. 4 is an enlarged sectional view of a modified backing ring on the fillet of the journal.

Another backing ring R-2 (FIG. 4) has an annular body 52 and a stabilizing ring 54 fitted to it. The annular body 52 has a lip 56 which projects over the dust guard diameter 4 where it is provided with a counterbore of sorts that includes an undercut 58 that opens toward the dust guard diameter 4.

The ring 54 has inner and outer legs 60 and 62, respectively, which are directed axially and lie parallel to each other, the former being within the latter. It also includes an intervening section 64 which connects the two legs 60 and 62, it being joined to one end of each leg 60 and 62. The intervening section 64 from where it is attached to the legs 60 and 62, turns back into the space between the legs 60 and 62 and here doubles back upon itself so as to have a generally U-shaped configuration. The legs 60 and 62 and the intervening section 64 are formed integral from a material having a good measure of resiliency, spring steel or stainless steel being preferred. Thus, the intervening section 64 permits the outer leg 62 to displace inwardly toward the inner leg 60 without exceeding the elastic limit of the material from which the ring 54 is formed, and when the outer leg 62 is so displaced, the intervening section 64 urges the outer leg 62 outwardly away from the inner leg 60.

Indeed, the ring 54 exists in a state of radial compression between the lip 56 and the axle A. In particular, the inner leg 60 fits over the dust guard diameter 4 with an interference fit, while outer leg 62 fits within the undercut 58 of the lip 56. The intervening section 64 exists within a state of compression, thus urging the outer leg 62 outwardly against the lip 56.

To install the backing ring R-2 on the journal 2 of the axle A, the stabilizing ring 54 is snapped into the undercut 58 in the lip 56 of the body 52. Then the body 52 and ring 54 are advanced over the journal 2, with the lip 56 and ring 54 leading. The inner leg 60 of the ring 54 rides up the fillet 6 of the journal 2 and onto dust guard diameter 4. The body 52 continues to advance until its arcuate inner surface 40 bears against the fillet 6. Here it is firmly clamped with a force exerted by the cap screws 16 and transferred through the end cap 12, wear rings 14, and bearing B.

Figure 5:
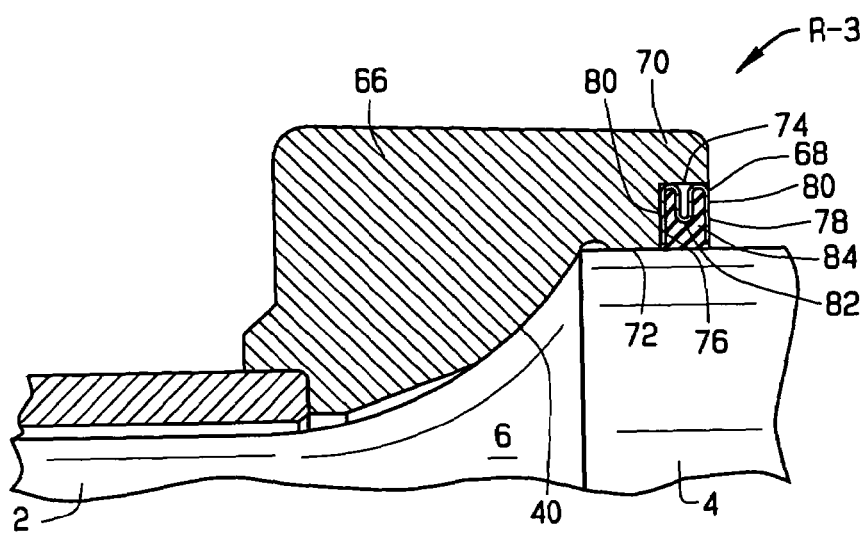
FIG. 5 is a sectional view of another modified backing ring.

Another backing ring R-3 (FIG. 5) has an annular body 66 and a stabilizing ring 68 fitted to the body 66. The body 66 resembles the body 34 for the ring R-1 in all respects, except for a lip 70 which projects over the dust guard diameter 4. Here the body 66 has a counterbore 72 which receives the dust guard diameter 4 either loosely or with an interference fit, depending on the diameter of the dust guard diameter 4. The counterbore 72 opens into another counterbore 74 at a shoulder 76 which is squared off with respect to the axis X, and the counterbore 74 in turn opens out of the end of the body 66.

The stabilizing ring 68 fits tightly into the large counterbore and tightly embraces the axle A around the dust guard diameter 4. The ring 68 has a steel case 78, which like the ring 54 for the backing ring R-2, has parallel legs 80 and a U-shaped intervening section 82 that lies between the two legs 80. In contrast to the stabilizing ring 54 of the backing ring R-2, the legs 80 of the stabilizing ring 68 are oriented radially. Moreover, the inside diameter of the legs 80 is slightly greater than the dust guard diameter 4.

In addition to its case 78, the stabilizing ring 68 contains a flexible core 84 which completely fills the interior of the case 78 where it is bonded to the legs 80 and intervening section 82. The core 84 has an inside cylindrical surface, the diameter of which is less than the diameter of the dust guard diameter 4.

The backing ring R-3 is installed over the journal 2 with the stabilizing ring 68 received in the large counterbore 74. As the backing ring R-3 advances over the journal 2 it first encounters the fillet 6 at the core 84 of its securement ring 68. The core 84 expands and rides up over the dust guard diameter 4, snugly embracing that surface. The stabilizing ring 68 both stabilizes the annular body 66 and effects a seal with the dust guard diameter 4 to prevent water from seeping into the space between the fillet 6 and the arcuate inner surface 40 of the body 66.

To achieve an even tighter ft, the case 78, once the end cap 12 is installed, may be plastically deformed by driving the legs 80 of its case 78 together with a tool fitted over the dust guard diameter 4 and brought against the exposed leg 80. The deformation forces the core 84 to contract axially and establish an even tighter grip on the dust guard diameter 4.

Figure 6:
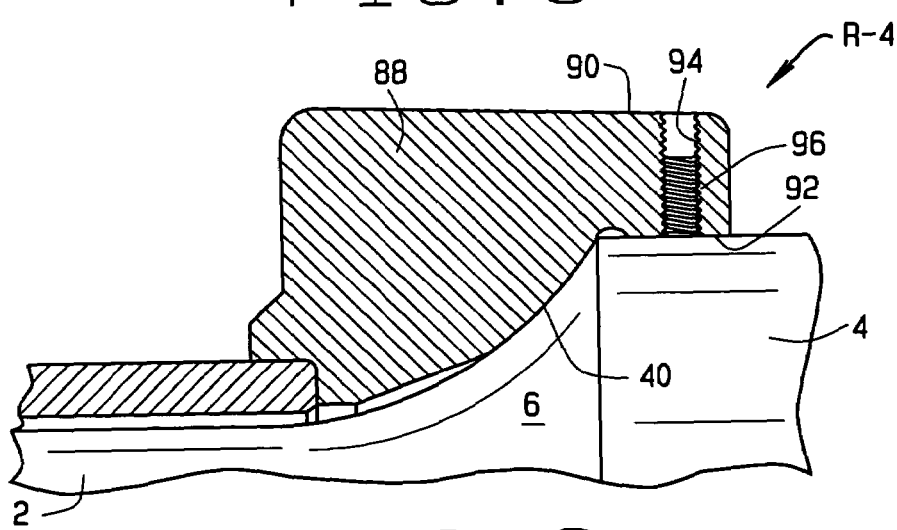
FIG. 6 is a sectional view of still another modified backing ring.

Still another backing ring R-4 (FIG. 6) has an annular body 88 that resembles the body 34 of the backing ring R-1, dffering only at its lip 90 which projects over the dust guard diameter 4. The lip 90 contains a counterbore 92 which receives the end of the dust guard diameter 4, either loosely or with an interference fit, depending on the diameter of the dust guard diameter 4. The lip 90 also contains several— perhaps four to six—threaded holes 94 which extend radially at equal circumferential intervals and pass completely through the lip 90. Each hole 94 receives a set screw 96.

The backing ring R-4 is installed over the journal 2 with its set screws 96 backed off so that they are retracted fully into their threaded holes 94. Once the arcuate inner surface 40 seats firmly against the fillet 6, in which event the lip 90 is around the dust guard diameter 4, the screws 96 are turned down in the threaded holes 94. The inner ends of the screws 96 bear against the dust guard diameter 4, securing the body 90 firmly around the fillet 6 on the journal 2 and stabilizing it.

Figure 7:
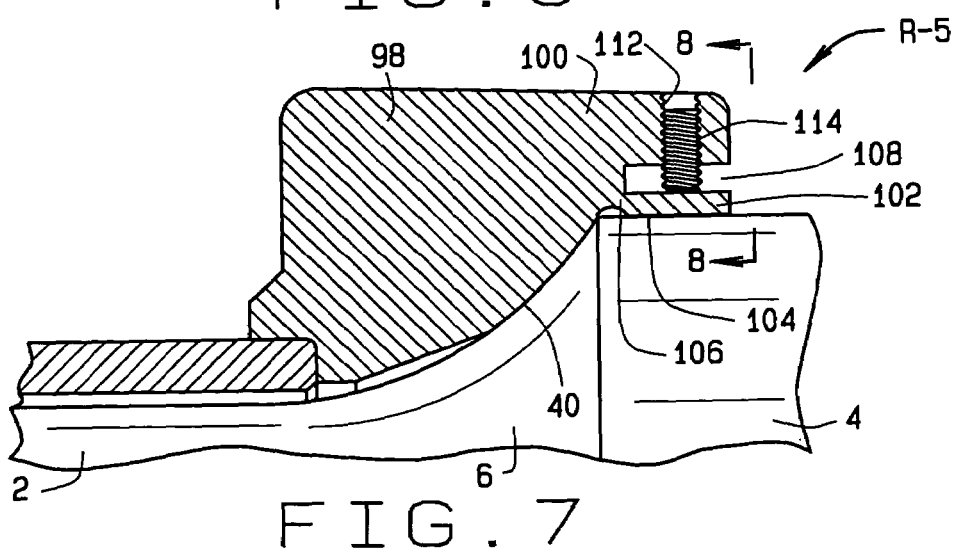
FIG. 7 is a sectional view of yet another modified backing ring.
Figure 8:
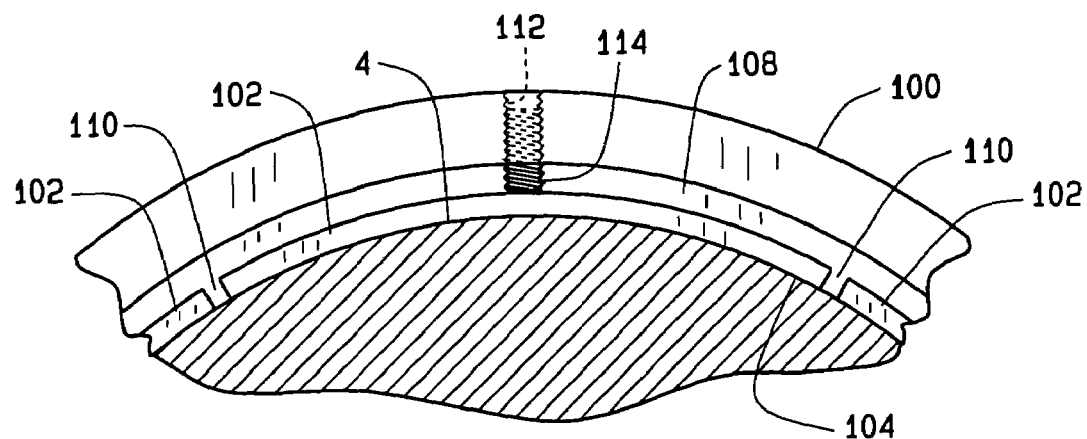
FIG. 8 is a fragmentary end view of the backing ring of FIG. 7 taken along line 8—8 of FIG. 7.

Another backing ring R-5 (FIGS. 7 & 8) resembles the backing ring R-4 in many respects. It has a body 98 provided with lip 100 that projects over the dust guard diameter 4, yet is spaced outwardly from it. Within the lip 100 are several— perhaps four to six—jaws 102 having inside gripping surfaces 104 which lie within a cylindrical envelope having a diameter that generally conforms to the diameter of the dust guard diameter 4. In any event, the jaws 102 are arranged at equal circumferential intervals within the lip 100. Both the lip 100 and the jaws 102 form an integral part of the body 98, but the jaws 102 are thin and each is attached to the remainder of the body 98 at an even thinner connecting section 106, thus giving each jaw 102 a measure of flexibility which enables it to move inwardly away from the lip 100. The jaws 102 may be formed by machining a groove 108 in the end of the body 98, with the groove 108 separating the lip 100 and jaws 102, and then with an end mill machining slits 110 (FIG. 8) to separate the individual jaws 102.

Centered behind each jaw 104 within the lip 100 is a threaded hole 112 which extends radially completely through the lip 100. Each hole 112 contains a jack screw 114 which is long enough to pass through the groove 108 and bear against the jaw 102 with which its threaded hole 112 aligns.

The backing ring R-5 is installed over the journal 2 with the jack screws 114 backed away from their jaws 102, so that a good measure of clearance exists between the jaws 102 and the set screws 114. As the arcuate inner surface 40 approaches the fillet 6, the jaws 102 ride over the end of the dust guard diameter 4 which they may grip, assuming that the dust guard diameter 4 is large enough. In any event, once the end cap 32 is installed and the body 98 of the backing ring R-5 along its inner arcuate surface 40 is seated firmly against the fillet 6 on the journal 2, the jack screws 114 are turned downwardly against the jaws 102 which underlie them. The jaws 102 flex inwardly and along their gripping surfaces 104 bear firmly against the dust guard diameter 4, thus securely positioning the backing ring R-4 around the fillet 6 and, in effect, stabilizing the annular body 98.

Figure 9:
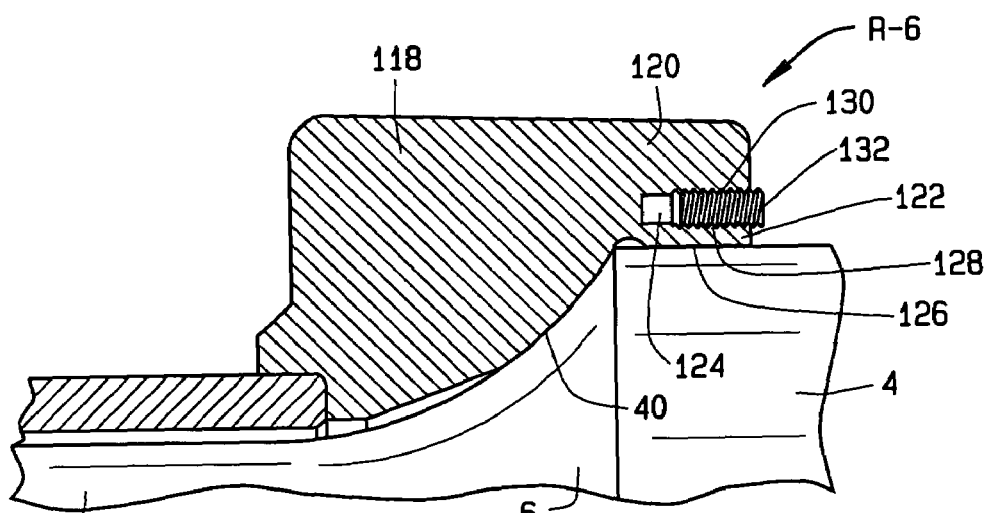
FIGS. 9–15 are sectional views of more modified backing rings.

Yet another backing ring R-6 (FIG. 9) is very similar to the backing ring R-5 in that its annular body 118 has a lip 120 and jaws 122 which closely resemble the lip 102 and jaws 104, respectively, of the ring R-5. The lip 120 and jaws 122 are separated by an annular groove 124. Each jaw 122 has an arcuate gripping surface 126 which conforms to the dust guard diameter 4. Midway between its ends each jaw 122 has an arcuate depression 128. The lip 120 directly opposite the depressions 128 in the jaws 122 has like depressions 130. The arcuate depressions 128 and 130 are threaded and each pair contains a set screw 132. Preferably the set screws 132 are slightly tapered, at least at their ends which lie within the annular groove 124.

When tightened, the screws 132 advance through their depressions 128 and 130 farther into the groove 124 and urge the jaws 122 radially inwardly. This causes the jaws 122 to clamp tightly against the dust guard diameter 4 and stabilized the annular body 118.

Figure 10:
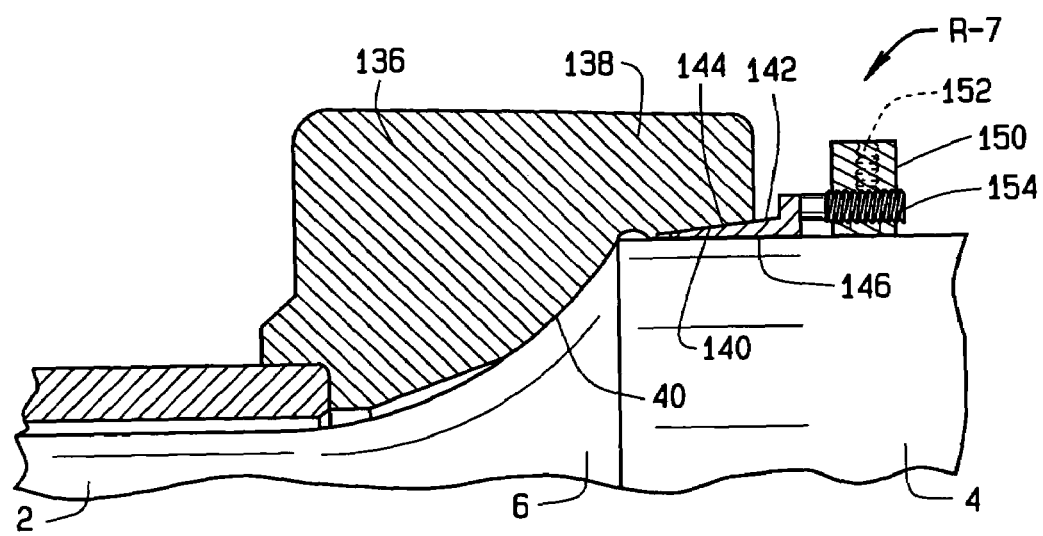

Yet another backing ring R-7 (FIG. 10) has an annular body 136 which closely resembles the body 36 of the ring R-1, but has a somewhat different lip 138 which projects over the dust guard diameter 4. The lip 138 has a tapered inside surface 140 which is presented inwardly toward the dust guard diameter 4, its large end being at the end surface of the lip 138.

In addition, the backing ring R-7 has a bushing 142 which fits between the lip 138 and the dust guard diameter 4. Indeed, the bushing 142 has a tapered outside surface 144 which bears against the tapered inside surface 140 on the lip 138 and a cylindrical inside surface 146 which is against the dust guard diameter 4. The taper of the outside surface 144 corresponds to the taper of the inside surface 140 on the lip 138. Moreover, the bushing 142 is split axially so that it can contract and expand, thus enabling its inside surface 146 to conform precisely to the dust guard diameter 4.

After the body 136 is clamped firmly against the fillet 6 under the force exerted by the screws 34 acting against the end cap 32, the tapered bushing 142 is forced underneath the lip 138. As the bushing 142 moves under the lip 138 its tapered outside surface 144 moves against the tapered inside surface 140 on the lip 138. This causes the bushing 142 to contract and lodge tightly between the lip 138 and the dust guard diameter 4. This, in turn, positions the body 136 firmly around the fillet 6. The tapered bushing 142 may be installed with a tool that fits around the dust guard diameter 4, but the possibility exists that it may work loose under the flexure of the journal 2. To both force the bushing 142 beneath the lip 138 and retain it in place, the backing ring R-7 may also include retaining collar 150 that fits around the dust guard diameter 4 behind the annular body 136. The collar 150 contains radial set screws 152 which, when turned down, bear against the dust guard diameter 4 and fix the collar 150 firmly in place on the surface 4. It also has axial set screws 154 which, when turned down, bear against the end of the tapered bushing 142 and hold it underneath the lip 138. Of course, the retaining collar 150 is installed over the journal 2 and onto the dust guard diameter 4 before the body 136 is advanced over the journal 2.

Figure 11:
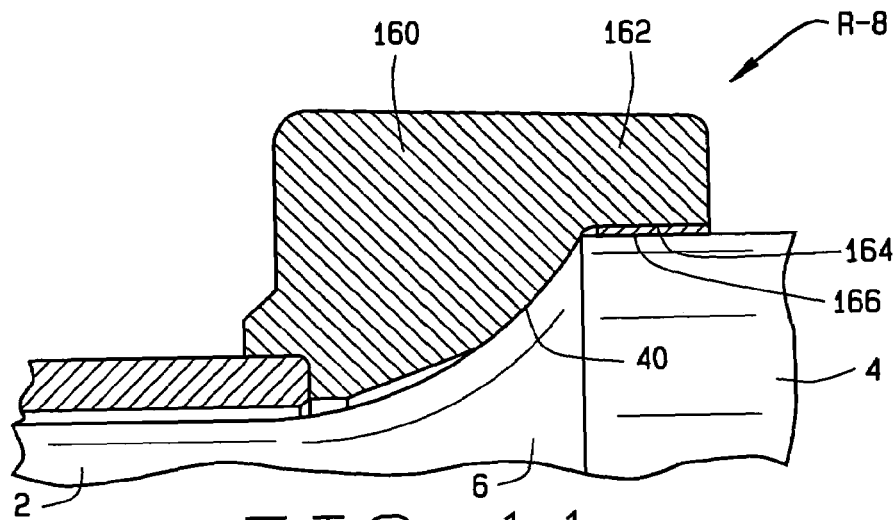

In another variation, a backing ring R-8 (FIG. 11), which also resembles the backing ring R-1, has an annular body 160 that is very similar to the body 36, except that its axially directed lip 162 has a smaller counterbore 164. The counterbore 164, which is cylindrical in configuration, opens out of the end of the lip 162 and possesses in diameter slightly greater than the diameter of the dust guard diameter 4. Both diameters are known. The backing ring R-8 also includes a stabilizing bushing 166 which fits around the dust guard diameter 4 and in the counterbore 164, there being an interference fit with each. The bushing 166 is selected from an inventory of bushings 166 having different inside and outside diameters, with the diameters of the selected bushing 166 being such that an interference fit exists between its inside surface and the dust guard diameter 4 and another interference fit exists between its outside surface and the surface of the counterbore 164.

To install the backing ring R-8 on the axle A, the selected bushing 166 is forced over the dust guard diameter 4 to a position immediately behind the fillet 6. Then the annular body 160 is advanced over the journal 2, and, after its lip 162 moves over the fillet 6, the lip 162 is forced over the bushing 166 that is already in place on the dust guard diameter 4. The interference fits enable the bushing 166 to position the lip 162 in a fixed position with respect to the axle A, and this reduces movement between the annular body 160 and the fillet 6. In other words, it stabilizes the annular body 160 around the fillet 6.

Figure 12:
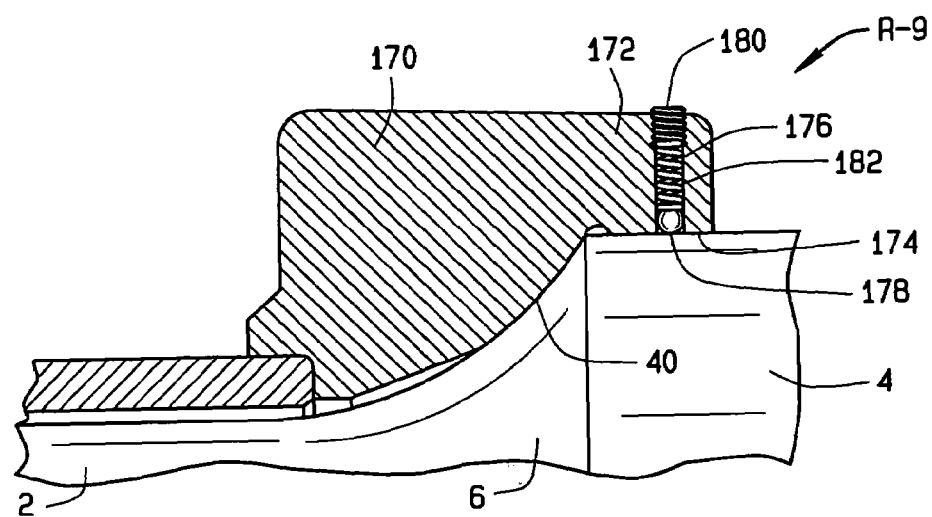

Still another backing ring R-9 (FIG. 12) is similar in many respects to the backing ring R-4. It includes annular body 170 having a lip 172 provided with a counterbore 174 that receives the region of the dust guard diameter 4 immediately behind the fillet 6. The lip 172 contains several radially directed bores 176 located at equal circumferential intervals, and these bores 176 open out of its exterior surface and also into the counterbore 174. Each bore 176 contains a stabilizing ball 178 at its inner end, a threaded plug 180 at its outer end, and a coil-type compression, spring 182 between its ball 176 and plug 180. The spring 182 exists in a state of compression and the force exerted by it on the ball 176 depends on the distance the plug 128 is threaded into the bore 176. At its inner end, each bore 176 is reduced in diameter to prevent the spring 182 from forcing the ball 128 out of the bore 176 when the ring R-9 is detached from the journal 2, but not enough to prevent the ball 178 from projecting out of its bore 176 and into the counterbore 174.

Indeed, as the lip 172 on the annular body 170 moves up the fillet 6 and over the dust guard diameter 4, the balls 178 are deflected outwardly and retract into their bores 176. The springs 182, however, urge the balls 178 inwardly, so that they bear tightly against the dust guard diameter 4. The forces exerted by the balls 178 on the dust guard diameter 4 stabilize the annular body 170 of the backing ring R-9 around the fillet 6.

Figure 13:
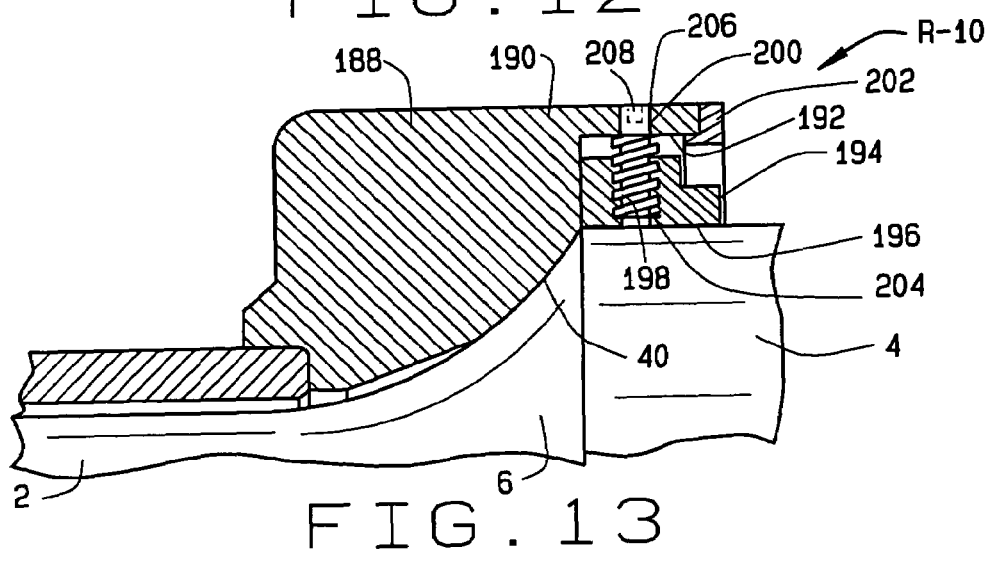

Yet another backing ring R-10 (FIG. 13) incorporates the principle of a three-jaw chuck to stabilize it. The ring R-10 includes an annular body 188 having an axially directed lip 190 which projects over the dust guard diameter 4 where it is provided with a counterbore 192 that is considerably larger than the dust guard diameter 4. The counterbore 192 contains multiple stabilizing jaws 194—preferably three—arranged circumferentially within the counterbore 192 in radial symmetry. Each jaw 194 has an arcuate gripping surface 196, the radius of which generally matches the radius of the dust guard diameter 4. The radial dimension of each jaw 194 affords a clearance between the gripping surface 196 and the dust guard diameter 4 when the jaw 194 is backed away toward the surface of the counterbore 192. Each jaw 194 also has a threaded hole 198, which extends radially in it and aligns with a radial bore 200 of lesser diameter in the lip 190.

The multiple jaws 194 are confined to the counterbore 194 by a retaining ring 202 which is attached to the end of the lip 190 by screws that thread into the lip 190. The ring 202 projects radially inwardly beyond the surface of the counterbore 192.

The threaded hole 198 in each jaw 194 receives a jack screw 204 having a reduced head 206 which projects into the radial bore 200 with which the screw 204 aligns. The head 206 at its end has a socket 208 that is configured to enable a wrench to engage the screw 204 and turn it.

The backing ring R-10 during installation is advanced over the journal 2 with its jaws 194 retracted. The jaws 194 accordingly pass over the dust guard diameter 4. Once the annular body 188 along its arcuate inner surface 44 seats firmly against the fillet 6, the jack screws 204 are turned with a wrench to drive the jaws 194 inwardly. The jaws 194 along their gripping surfaces 196 bear tightly against the dust guard diameter 4 and stabilize the annular body 188 around the fillet 6 of the journal 2.

Figure 14:
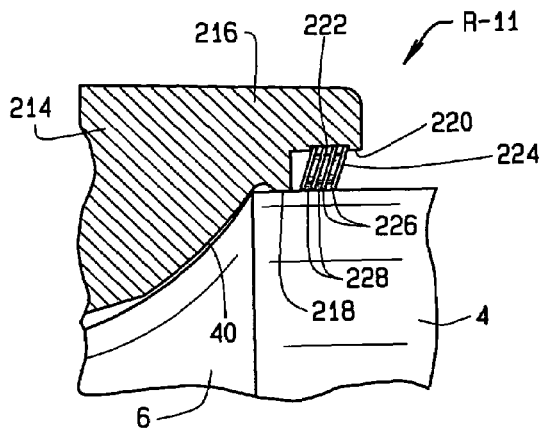

Another backing ring R-11 (FIG. 14) has an annular body 214, which like the body 66 of the ring R-2, has a lip 216 provided with a counterbore 218 which receives the end of the dust guard diameter 4 immediately adjacent to the fillet 6 with little, if any clearance. The counterbore 218 opens into another counterbore 220 that opens out of the end of the lip 216, but the counterbore 218 is interrupted by an undercut 222 which opens radially inwardly toward the dust guard diameter 4.

The longer counterbore 218 in the end of the lip 216 contains a stabilizing ring 224, the inner margin of which fits over and bears against the dust guard diameter 4, while the periphery of the ring 224 is received in the undercut 222. The stabilizing ring 224 consists of several steel disks 226 and elastomeric connecting elements 228 which separate the disks 226 and are bonded to them. The stabilizing ring 224 along it disks 226 bears against the dust guard diameter 4 and projects into the undercut 222, and when the ring 224 is so disposed, its disks 226, while being close to perpendicular with respect to the axis X, are nevertheless slightly oblique. The elastomeric connecting elements 228 enable the disks 226 to assume infinite angular positions oblique to the axis, and thereby accommodate slight variations in spacing between the dust guard diameter 4 and the base of the undercut 222.

When the backing ring R-11 is off the journal 2, the disks of its stabilizing ring 224 lie generally perpendicular to the axis X. When the backing ring R-11 approaches the fillet 6 during installation, the disks 226 of the ring 224 will ride up the large end of the fillet 6 and onto the dust guard diameter 4, assuming a slightly oblique orientation in which they lodge tightly between the dust guard diameter 4 and the base of the surrounding groove 222. In this condition the ring 224 stabilizes the annular body 214 around the fillet 6.

Figure 15:
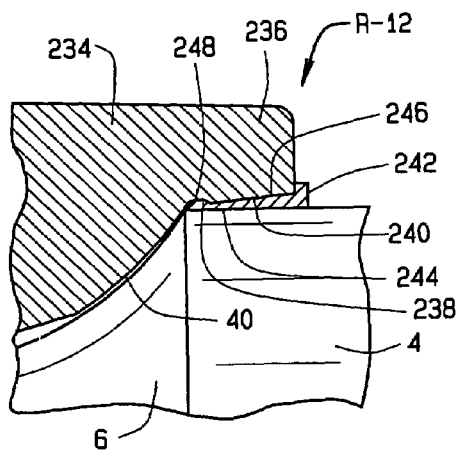

Another backing ring R-12 (FIG. 15) somewhat resembles the backing ring R-7 without its retaining collar 150. The backing rings R-12 has an annular body 234 provided with a lip 236 which projects over the dust guard diameter 4 when the arcuate inner surface 44 of the body 234 is against the fillet 6 of the journal 2. The lip 236 contains a groove 238 where it emerges from the arcuate inner surface 44 and a tapered inside surface 240 which leads away from the groove 238, tapering outwardly toward the free end of the lip 236. Both the groove 238 and the tapered surface 240 are spaced from dust guard diameter 4 of the axle A.

In addition to the annular body 234, the backing ring R-12 has a tapered stabilizing ring 242 which fits tightly between the lip 236 of the annular body 234 and the dust guard diameter 4 of the axle A. Indeed, the stabilizing ring 242 has a cylindrical inside surface 244 which bears against and conforms to the cylindrical dust guard diameter 4 of the axle A. It also has a tapered outside surface 246, the taper of which corresponds to the taper of the inside surface 240 in the lip 236. At the small diameter end of the tapered outside surface 246 the ring 242 has a rib 248. The tapered outside surface 246 of the ring 242 bears tightly against the tapered inside surface 240 of the lip 236, while the rib 248 fits into the groove 238 and prevents the ring 242 from migrating out of the lip 236. The ring 242 is split axially with a slight space between the ends that lie along the axial slit, this to enable the ring 242 to contract and permit the inside surface 244 to conform to the dust guard diameter 4.

To install the backing ring R-12 on the axle, the stabilizing ring 242 is first placed over the dust guard diameter 4 back from the position that it will eventually assume. Then the annular body 234 is advanced over the journal 2 with its lip 236 leading. Thereafter, the bearing B, wear rings 14, and end cap 32 are installed. When the cap screws 36 are tightened, the annular body 234 of the backing ring R-11 at its arcuate inside surface 44 seats firmly against the fillet 6 and the lip 236 projects over the dust guard diameter 4. Thereupon, with a tool that fits around the dust guard diameter 4, the ring 242 is forced under the lip 236. As the ring 242 moves along the inside tapered surface 240 of the lip 236 it contracts, and eventually its rib 248 snaps into the groove 238 at the small end of the tapered surface 240 and holds the ring 242 in place. With the stabilizing ring 242 so disposed, it is lodged tightly between the lip 236 of the annular body 234 and the dust guard diameter 4 of the axle A. This firmly positions and stabilizes the annular body 234 around the fillet 6.

Figure 16:
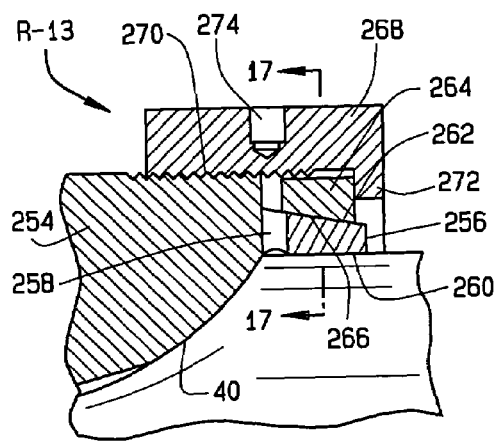
FIG. 16 is a sectional view of yet another modified backing ring.
Figure 17:
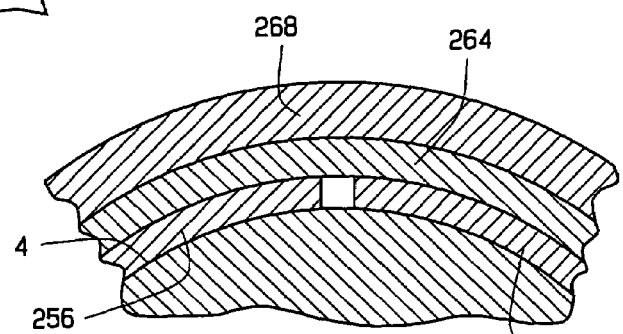
FIG. 17 is a sectional view of the backing ring of FIG. 16 taken along line 17—17 of FIG. 16.

Yet another backing ring R-13 (FIGS. 16 & 17) uses jaws to stabilize it along the dust guard diameter 4 and in that sense is similar to the rings R-5, R-6 and R-10. The backing ring R-13 includes an annular body 254, the arcuate inner surface 40 of which seats against the fillet 6 of the journal 2. The annular body 254 supports several stabilizing jaws 256 which are attached to it at reduced connecting sections 258 and extend over and around the dust guard diameter 4. The jaws 256 have inside surfaces 260 which conform closely to the cylindrical dust guard diameter 4. The jaws 256 also have tapered outside surfaces 262 which lie in a conical envelope.

Encircling the jaws 256 is a bushing 264 having a tapered inside surface 266 which conforms to the conical envelope defined by the tapered outside surfaces 262 on the jaws 256. Indeed, the bushing 264 along its inside surface 266 bears against the outside surfaces 262 of the jaws 256.

The backing ring R-13 also has a collar 268 which encircles the bushing 264 that is around the jaws 256 and also encircles the annular body 254 beyond the jaws 256. Here the collar 268 engages the annular body 254 along mating threads 270 and, in effect, forms a lip which projects over the dust guard diameter 4. At its opposite end the collar 268 has an inwardly directed rib 272 that lies behind the bushing 264. Finally, the collar 268 has several sockets 274 which open radially out of it, so that it may be engaged with a wrench and turned.

When the collar 268 is turned in the proper direction, it advances over the annular body 254. Its inwardly direct rib 272 drives the bushing 264 over the jaws 258. The tapered inside surface 266 of the bushing 264 moves axially over the tapered outside surfaces 262 of the jaws 258, forcing the jaws 258 inwardly. As a consequence, the jaws 256 tightly grip the dust guard diameter 4 along their inside gripping surfaces 260. This stabilizes the annular body 254 around the fillet 6.

Each of the backing rings R has an annular body that fits around the fillet 6 on the journal 2 and is provided with a lip which projects over the adjacent portion of the dust guard diameter 4. Each also has an element which cooperates with the lip to stabilize the lip and the annular body around the axle A. Being stabilized, the annular body experiences less movement in the presence of cyclic flexures in the journal 2. This reduces motion at the interface between the fillet 6 and the inner face 44 of the annular body. As a consequence, fretting is markedly reduced at the interface. All of the backing rings R fit axles having dust guard diameters 4 that are not machined to precise tolerances. Indeed, they can accommodate dust guard diameters 4 of varying diameters within limits. Most of the backing rings R either effect a seal with the dust guard diameter 4 or can be modified to do so, and the seal will prevent moisture from migrating onto the fillet 6 and producing corrosion. The backing rings R may be utilized with other types of bearings, such as cylindrical roller bearings and spherical roller bearings. Moreover, they may be utilized with bearings that do not require the wear rings 14, but instead bear directly against the backing rings and end caps, and have seals which seal against surfaces on the bearings themselves.

TIMKEN: PARTS LIST
BACKING RING FOR RAILCAR AXLE

| | |
|---|---|
| A | axle |
| B | bearing |
| X | axis |
| 2 | journal |
| 4 | dust guard diameter |
| 6 | fillet |
| 8 | end face |
| 10 | threaded holes |
| 12 | end cap |
| 14 | wear rings |
| 16 | cup screws |
| 20 | cup |
| 22 | cones |
| 24 | tapered rollers |
| 26 | spacer |
| 28 | seals |
| 30 | thrust ribs |
| 32 | back faces |
| R-1 | |
| 36 | annular body |
| 38 | stabilizing ring |
| 40 | arcuate inner surface |
| 42 | conical surface |
| 44 | counterbore |
| 46 | lip |
| 48 | counterbore |
| 50 | shoulder |
| R-2 | |
| 52 | annular body |
| 54 | stabilizing ring |
| 56 | lip |
| 58 | undercut |
| 60 | inner leg |
| 62 | outer leg |
| 64 | intervening section |
| R-3 | |
| 66 | body |
| 68 | stabilizing ring |
| 70 | lip |
| 72 | counterbore |

TIMKEN: PARTS LIST
BACKING RING FOR RAILCAR AXLE
-continued

| | |
|---|---|
| 74 | large counterbore |
| 76 | shoulder |
| 78 | case |
| 80 | legs |
| 82 | intervening section |
| 84 | core |
| 86 | inside surface |
| R-4 | |
| 88 | body |
| 90 | lip |
| 92 | counterbore |
| 94 | threaded holes |
| 96 | set screws |
| R-5 | |
| 98 | body |
| 100 | lip |
| 102 | jaws |
| 104 | gripping surface |
| 106 | connecting sections |
| 108 | groove |
| 110 | slits |
| 112 | threaded holes |
| 114 | set screws |
| R-6 | |
| 118 | body |
| 120 | lip |
| 122 | jaws |
| 124 | jaws |
| 126 | gripping surface |
| 128 | depression |
| 130 | depression |
| 132 | set screws |
| R-7 | |
| 136 | body |
| 138 | lip |
| 140 | tapered inside surface |
| 142 | bushing |
| 144 | tapered outside surface |
| 146 | cylindrical inside surface |
| 150 | retaining collar |
| 152 | radial screws |
| 154 | axial screws |
| R-8 | |
| 160 | annular body |
| 162 | lip |
| 164 | counterbore |
| 166 | bushing |
| R-9 | |
| 170 | annular body |
| 172 | lip |
| 174 | counterbore |
| 176 | radial bores |
| 178 | ball |
| 180 | threaded plug |
| 182 | spring |
| R-10 | |
| 188 | annular body |
| 190 | lip |
| 192 | counterbore |
| 194 | jaws |
| 196 | gripping surface |
| 198 | threaded hole |
| 200 | radial bore |
| 202 | retaining ring |
| 204 | jack screw |
| 206 | head |
| 208 | socket |

-continued

TIMKEN: PARTS LIST
BACKING RING FOR RAILCAR AXLE

R-11

| | |
|---|---|
| 214 | annular body |
| 216 | lip |
| 218 | counterbore |
| 220 | larger counterbore |
| 222 | undercut |
| 224 | stabilizing ring |
| 226 | disks |
| 228 | connecting elements |

R-12

| | |
|---|---|
| 234 | annular body |
| 236 | lip |
| 238 | groove |
| 240 | tapered inside surface |
| 242 | stabilizing ring |
| 244 | cylindrical inside surface |
| 246 | tapered outside surface |
| 248 | rib |

R13

| | |
|---|---|
| 254 | annular body |
| 256 | jaws |
| 258 | connecting sections |
| 260 | inside surfaces |
| 262 | outside surfaces |
| 264 | bushing |
| 266 | inside surface |
| 268 | collar |
| 270 | threads |
| 272 | rib |
| 274 | sockets |

What is claimed is:

1. In combination with a rail car axle having a journal and a larger cylindrical surface located adjacent to the journal, with the journal merging into the larger cylindrical surface at a fillet, and with a bearing that fits around the journal and an end cap that fits over the end of the journal for preventing the bearing from migrating axially off the journal, an improved backing ring located between the bearing and the fillet, said backing ring comprising:
   an annular body having an inner surface along which it seats against the fillet of the journal and a lip which projects over the larger cylindrical surface, and
   at least one stabilizing element cooperating with the lip to lessen motion between the lip and the cylindrical surface in the presence of flexures of journal, whereby the annular body is stabilized around the fillet.

2. The combination according to claim 1 wherein the stabilizing element fits between the lip on the annular body and the cylindrical surface on the axle.

3. The combination according to claim 2 wherein the stabilizing element is a ring that is radially compressible.

4. The combination according to claim 3 wherein the stabilizing element is tubular.

5. The combination according to claim 4 wherein the stabilizing element is substantially circular in cross section.

6. The combination according to claim 4 wherein the stabilizing element is formed from steel.

7. The combination according to claim 2 wherein the stabilizing ring has inner and outer legs and a U-shaped intervening section located between the legs and connected to each leg at one of its ends, the inner leg being against the larger cylindrical surface and the outer let being against the lip.

8. The combination according to claim 2 wherein the stabilizing ring has a case, including spaced apart legs and an intervening element located between the legs and connected to the end of each leg, and also has an elastomeric core located between the legs.

9. The combination according to claim 2 wherein the lip has a tapered inside surface which is presented toward the larger cylindrical surface on the axle, and the stabilizing element is a stabilizing ring having a tapered outside surface, with the stabilizing ring being fitted between the lip and the larger cylindrical surface and having its tapered outside surface against the tapered inside surface in the lip.

10. The combination according to claim 9 wherein the annular body contains a groove and the tapered inside surface in the lip tapers downwardly toward the groove; and wherein the stabilizing ring has a rib at the small end of its tapered outside surface, with the rib being received in the groove that is in the annular body.

11. The combination according to claim 9 and further comprising a retaining ring fitted firmly to the axle around the large cylindrical surface such that it prevents the stabilizing ring from migrating out of the space between the lip and the large diameter surface.

12. The combination according to claim 1 wherein the stabilizing element is at least one set screw that is threaded into the lip and exerts a force on the axle at the larger cylindrical surface on the axle.

13. The combination according to claim 1 wherein the lip contains a generally radially directed bore which opens toward the larger cylindrical surface on the axle and the stabilizing element is in the bore; and further comprising a plug in the bore and a spring in the bore between the plug and the stabilizing element to urge the stabilizing element against the larger cylindrical surface on the axle.

14. The combination according to claim 1 wherein the stabilizing element is at least one jaw located between the lip and the large cylindrical surface.

15. The combination according to claim 14 and further comprising a jack screw threaded into the lip and oriented generally radially for exerting a radially directed force on the jaw.

16. The combination according to claim 14 and further comprising a jack screw threaded axially between the jaw and the lip to urge the jaw inwardly against the larger cylindrical surface.

17. The combination according to claim 14 wherein the jaw is formed integral with the body; and further comprising a jack screw threaded into the lip for urging the jaw inwardly against the larger cylindrical surface.

18. The combination according to claim 14 wherein the jaw contains a jack screw which operates against the lip to urge the jaw inwardly against the larger cylindrical surface.

19. The combination according to claim 2 wherein the stabilizing element is a bushing lodged between the lip and the larger cylindrical surface on the axle.

20. The combination according to claim 2 wherein stabilizing element comprises a plurality of disks lodged obliquely between the lip and the larger cylindrical surface of the axle and connecting elements joining the disks such that the inclination of the disks with respect to larger diameter surface can vary.

21. The combination according to claim 2 wherein the stabilizing element includes an annular case and a core within the case, with the core having substantially greater resiliency than the case.

22. The combination according to claim 1 wherein the stabilizing element is one of several jaws that are attached to the annular body and encircle the larger cylindrical surface of the axle, the jaws having tapered outside surfaces; wherein a bushing encircles the jaws; and wherein the lip is a collar that surrounds the jaws and bushing and moves axially to force the bushing over the tapered surfaces on the jaws and urge the jaws inwardly.

23. In combination with a rail car axle having a journal and a larger cylindrical surface beyond which the journal projects, with the journal merging into the larger cylindrical surface at a fillet, and with a bearing that fits around the journal and an end cap that fits over the end of the journal for preventing the bearing from migrating axially off the journal, an improved backing ring located between the bearing and the fillet, said backing ring comprising:
- an annular body having an inner surface which seats against the fillet of the journal and a lip which projects over the large cylindrical surface and is spaced outwardly from the surface; and
- a stabilizing ring located between the lip and the large cylindrical surface, the ring being formed being radially compressible.

24. The combination according to claim 19 wherein the ring in cross section is tubular.

25. The combination according to claim 24 wherein the ring is initially substantially circular in cross section.

26. In combination with a rail car axle having a journal and a larger cylindrical surface located adjacent to the journal, with the journal merging into the larger cylindrical surface at a fillet, and with a bearing that fits around the journal and an end cap that fits over the end of the journal for preventing the bearing from migrating axially off the journal, an improved backing ring located between the bearing and the fillet, said backing ring comprising:
- an annular body having an inner surface along which it seats against the fillet of the journal and a lip, which projects over the larger cylindrical surface;
- and stabilizing means cooperating with the lip to lessen motion between the lip and the cylindrical surface in the presence of flexures of journal.

* * * * *